United States Patent
Felix

(10) Patent No.: US 9,916,762 B2
(45) Date of Patent: Mar. 13, 2018

(54) PARALLEL PARKING SYSTEM

(71) Applicant: Ford Global Technologies, LLC, Southfield, MI (US)

(72) Inventor: Rodrigo Felix, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/990,068

(22) Filed: Jan. 7, 2016

(65) Prior Publication Data

US 2017/0200372 A1    Jul. 13, 2017

(51) Int. Cl.
| | |
|---|---|
| *B60Q 1/48* | (2006.01) |
| *G08G 1/16* | (2006.01) |
| *G08G 1/14* | (2006.01) |
| *G05D 1/00* | (2006.01) |
| *G01C 22/00* | (2006.01) |

(52) U.S. Cl.
CPC ............ *G08G 1/168* (2013.01); *G08G 1/147* (2013.01); *G08G 1/165* (2013.01)

(58) Field of Classification Search
CPC ......... G08G 1/168; G08G 1/147; G08G 1/165
USPC ....................................................... 340/932.2
See application file for complete search history.

(56) References Cited

U.S. PATENT DOCUMENTS

| | | | |
|---|---|---|---|
| 8,378,850 B2* | 2/2013 | Toledo ............... | B62D 15/0285 340/435 |
| 8,571,722 B2 | 10/2013 | Samples et al. | |
| 8,868,329 B2 | 10/2014 | Ikeda et al. | |
| 2011/0295469 A1* | 12/2011 | Rafii ...................... | E05F 15/43 701/49 |
| 2013/0154792 A1 | 6/2013 | Reed et al. | |
| 2013/0315443 A1* | 11/2013 | Kim ................... | G06K 9/00812 382/103 |
| 2015/0057870 A1 | 2/2015 | Lee | |
| 2015/0219760 A1* | 8/2015 | Hiramaki .......... | B62D 15/0285 367/99 |
| 2016/0046324 A1* | 2/2016 | Yu ......................... | B60Q 9/002 701/42 |
| 2016/0304088 A1* | 10/2016 | Barth ...................... | B60T 7/22 |
| 2016/0313731 A1* | 10/2016 | Leppanen .......... | B62D 15/0265 |

FOREIGN PATENT DOCUMENTS

| | | |
|---|---|---|
| CN | 102815297 A | 12/2012 |
| EP | 2428431 A1 | 3/2012 |

OTHER PUBLICATIONS

Search Report under Section 17(5) in corresponding international patent application No. GB1700248.6 dated Jul. 5, 2017, 3 pages.

* cited by examiner

*Primary Examiner* — Jack K Wang
(74) *Attorney, Agent, or Firm* — Frank MacKenzie; Brooks Kushman, P.C.

(57) ABSTRACT

A parallel parking system may include a controller configured to generate an alert identifying a discrepancy between a permitted parking distance that is defined by local requirements and a recommended parking distance that is defined by a minimum distance between an object adjacent to an available parking place to avoid contact with the object and an open vehicle door in a parked position in response to the recommended distance exceeding the permitted distance.

15 Claims, 5 Drawing Sheets

PARALLEL PARKING SYSTEM

TECHNICAL FIELD

Disclosed herein are enhanced parallel parking systems.

BACKGROUND

Parking guides and parking assist features are becoming increasingly prevalent in vehicles. Vehicle cameras and sensors, for example, are often used to display relevant vehicle views to aid the driver in parking. Furthermore, some vehicles include self-park capabilities.

SUMMARY

A parallel parking system may include a controller configured to generate an alert identifying a discrepancy between a permitted parking distance that is defined by local requirements and a recommended parking distance that is defined by a minimum distance between an object adjacent to an available parking place to avoid contact with the object and an open vehicle door in a parked position in response to the recommended distance exceeding the permitted distance.

A parking system for a vehicle may include a controller configured to generate an alert identifying a discrepancy between a permitted parking distance that is defined by local requirements and a recommended parking distance away from a curb that is based on an open door distance associated with the vehicle and an object distance associated with an object adjacent to an available parking place for the vehicle.

A method may include recognizing an object adjacent to a parking place for a vehicle, identifying a recommended parking distance based on an open door distance associated with the vehicle and a distance between the object and an expected position of the vehicle in the parking place, and generating an alert in response to the recommended distance exceeding a permitted distance that is defined by a location of the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein are parallel parking systems configured to take into consideration a distance needed for a vehicle door to be opened without coming into contact with an object adjacent to the parking place in which the vehicle is parked. The systems may instruct the park assist systems to account for the object and park the vehicle a certain distance away from the curb that would allow the vehicle door to open without coming into contact with the object. Furthermore, the system may look to local laws to determine if the necessary distance away from the curb exceeds a distance permitted by the local jurisdiction.

Figure 1A:
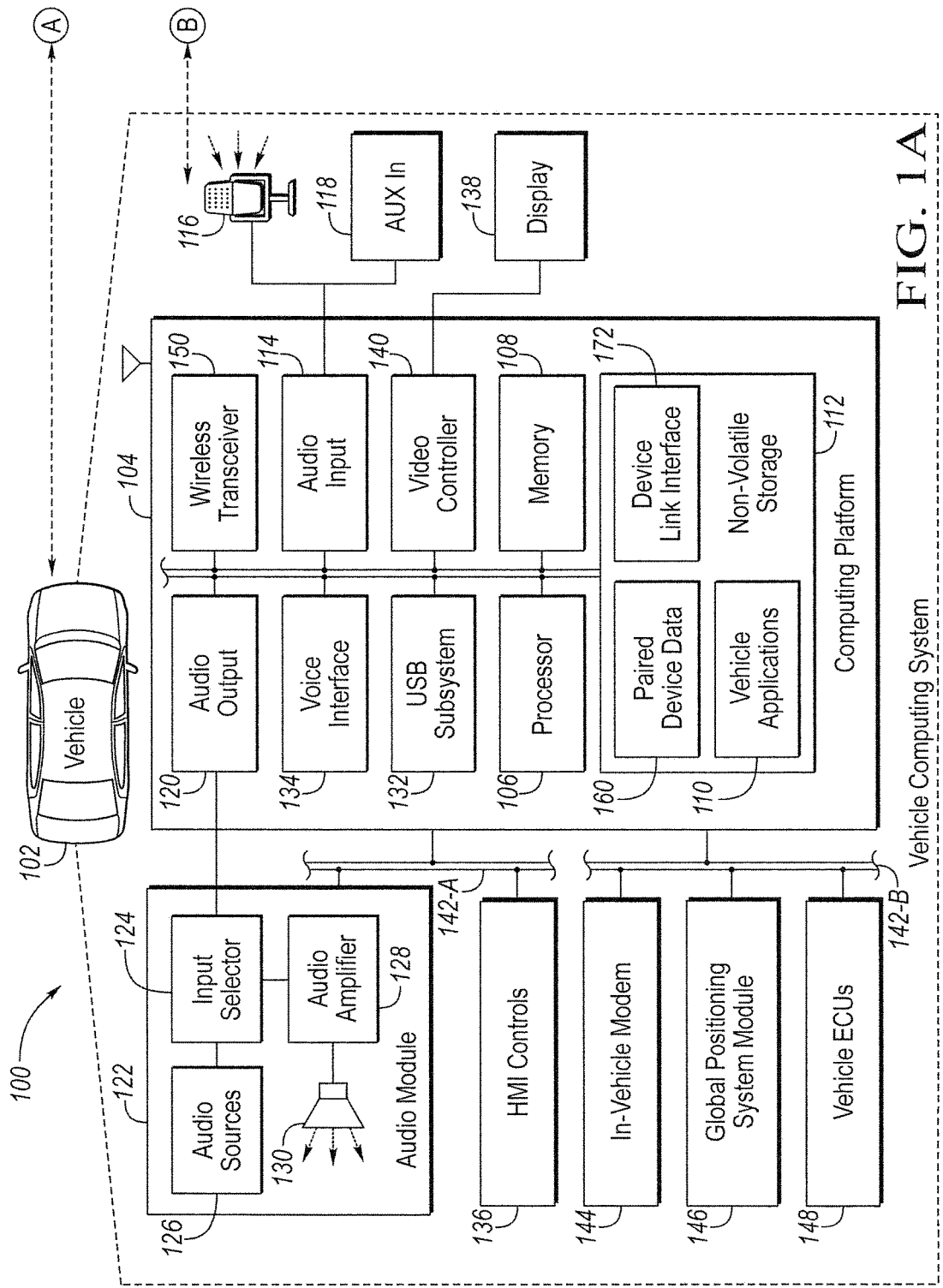
FIGS. 1A and 1B illustrate an example diagram of a system that may be used to provide telematics services to a vehicle.
Figure 1B:
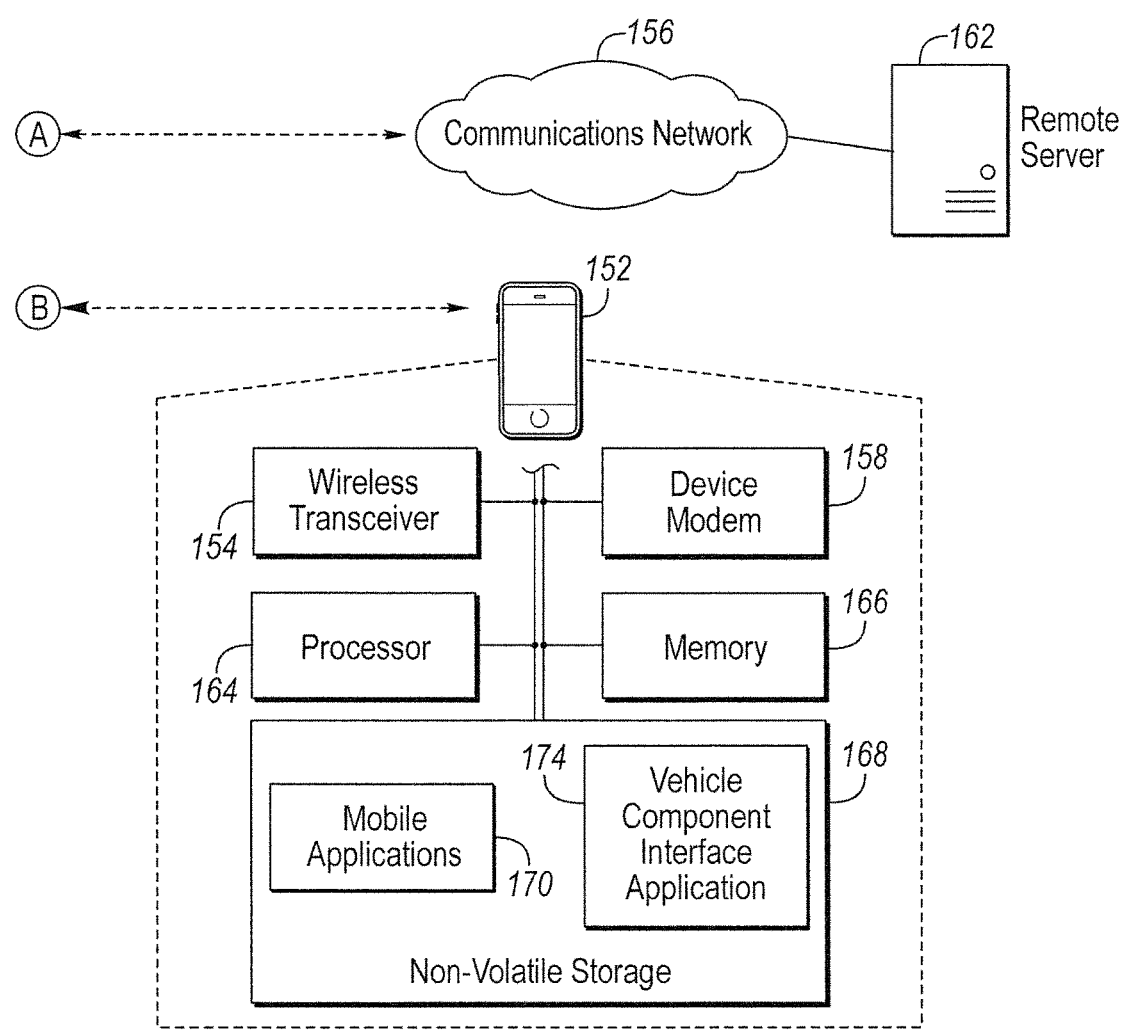

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, hands-free calling and parking assistance. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

Figure 2:
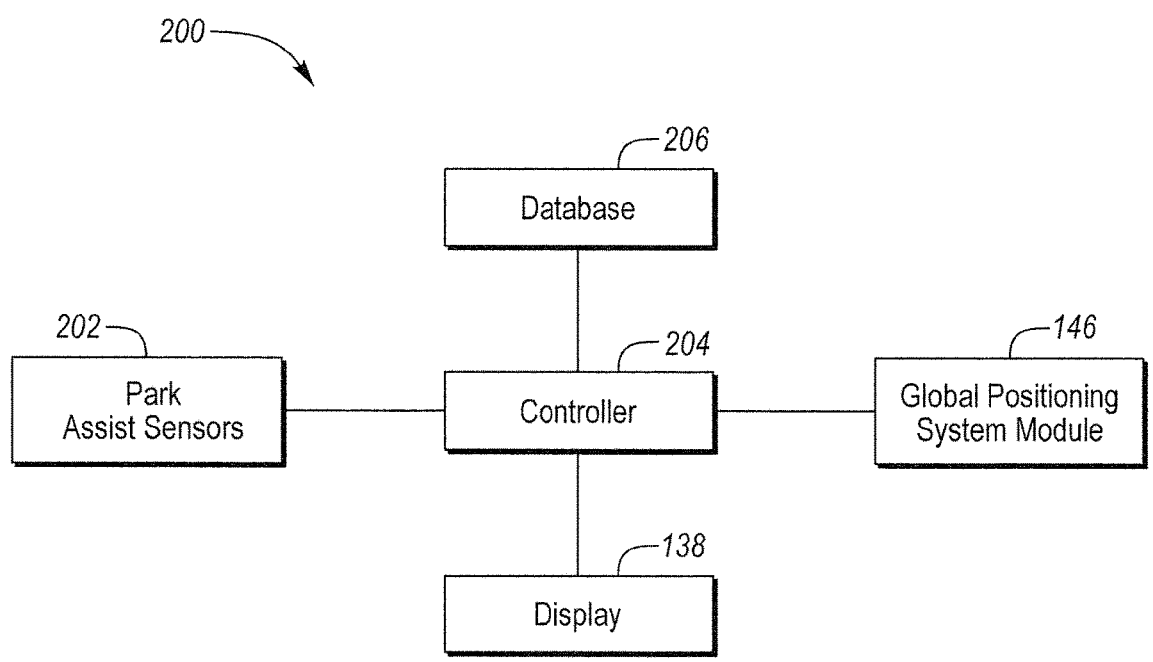
FIG. 2 illustrates an example block diagram of a parallel parking system.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.), and other sensors such as sensors 202, as shown in FIG. 2, etc.

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communication services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be one such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As explained in detail below, an appropriate mobile device 152 to display the vehicle component interface application 174 may be identified (e.g., mobile display 176), and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device to have been paired with or be in communication with the computing platform 104.

FIG. 2 illustrates an example block diagram of a parallel parking system 200. The system 200 may be configured as part of computing platform 104. The parallel parking system 200 may also be a standalone system, or configured as part of mobile device 152 and/or remote server 162. The parallel parking system 200 may include at least one sensor 202 configured to detect distances of objects external to the vehicle 102. The sensors 202 may be sensors typically used by park assist features that are configured to provide data which is in turn used to aid a user or driver in parking a vehicle 102. The sensors 202 may be ultrasonic sensors, infrared sensors, laser sensors, optical sensors, etc. The sensors 202 may additionally provide data that may be interpreted to indicate an available parking place by the controller 204.

The sensors 202 may also include one or more cameras capable of imaging areas around the vehicle 102. As the camera images certain areas while the vehicle 102 is driving, the computing platform 104 may recognize certain available parking places by analyzing various image frames. The camera images may also provide dimensions of available parking places, among other attributes.

The parallel parking system 200 may include a controller 204 having a processor and a memory for carrying out certain processes and instructions described herein. Although shown as a separate component, the controller 204 may be within or part of the computing platform 104. Similarly, a database (not shown) may be maintained within the computer-readable medium 112, which may also participate in providing instructions and other data that may be read by the processor 106 of the computing platform 104.

Figure 3A:
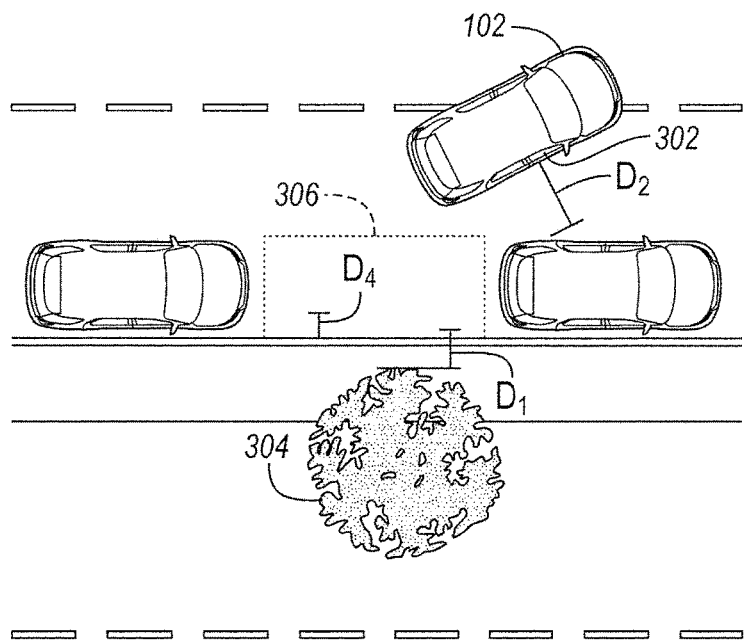
FIGS. 3A-3C illustrate example parking scenarios for the parallel parking system.
Figure 3B:
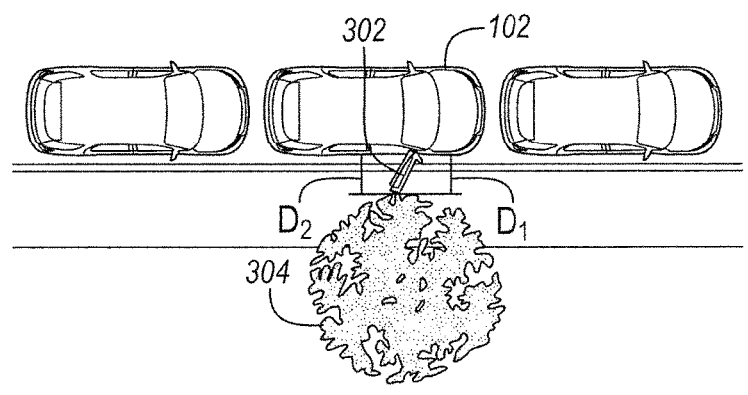
Figure 3C:
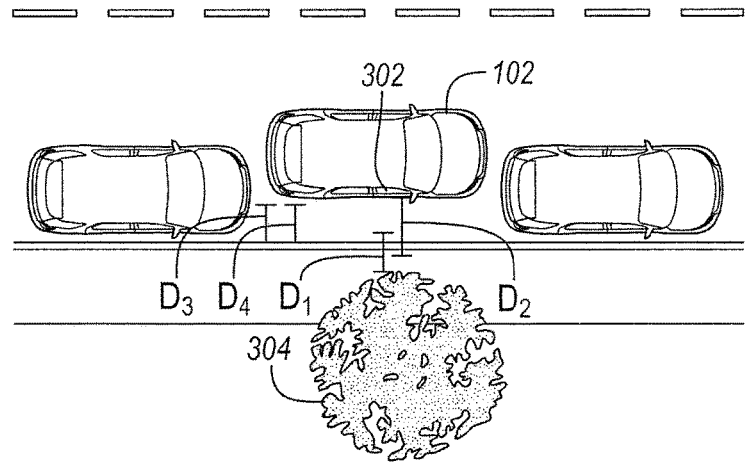

The computing platform 104 may also recognize, based on the sensor data, certain objects adjacent to available parking places. For example, a street sign may be arranged adjacent an available parking place, as illustrated in FIG. 3A. While the parking place may be available for the vehicle 102 to park therein, one or more of the vehicle doors 212 adjacent to the object may be unable to fully open once the vehicle 102 has parked. The computing platform 104 and/or controller 204 may be configured to analyze the images from the sensors 202 and determine an object distance $D_1$ away from a curb (as shown in FIGS. 3A-3C.)

The controller 204, as explained, may manage and control various vehicle components during park assist features. This may include controlling a vehicle steering wheel, wheel speed, wheel position, operation of the vehicle powertrain and brakes, etc. The controller 204 may control various vehicle components based on a park assist feature. The various park assist features may include active park assist features such as a semi-automatic parallel parking (SAPP) feature and a perpendicular park assist (PPA) feature, as well as a pull-out assist (POA) feature, among others.

The parallel parking system 200 may include a database 206 configured to maintain certain data regarding the park assist features and parking system 200. The database 206 may be part of the non-volatile storage 112, as illustrated in FIG. 1A. The database 206 may also be a standalone database. The database 206 may maintain a door distance $D_2$ which may represent a door open distance away from the vehicle 102. That is, how far from the vehicle does the door extend in an open position. The door distance $D_2$ may be specific to a vehicle make, model and year.

The controller 204 may be programmed to determine that if an object is present at an available parking place, and whether the location of that object may prevent an adjacent vehicle door from opening completely when a vehicle is parked in the associated parking place. That is, once parked, would the vehicle door come in contact with the object when opened. If the door distance D2 exceeds the object distance $D_1$, then the controller 204 may alert the driver as to the object. The controller 204 may further adjust the PPA so that the vehicle 102 is parked far enough from the curb to permit the vehicle door to fully open without coming into contact with the object. The controller 204 may determine an appropriate recommended parking distance $D_3$ by taking the difference between D1 and D2. A variance (e.g., approximately 6 inches) may also be added to the recommended parking distance $D_3$ to further ensure that contact is not made with the object. The recommended parking distance $D_3$ may be the minimum distance between the object and the vehicle 102 to avoid contact with the object and an open vehicle door.

The parallel parking system 200 may include the global position system module 146 (also referred to herein as GPS module 146 and location module and as shown in FIG. 1) which may be configured to determine a location of the vehicle 102. The GPS module 146 may transmit the vehicle location to the controller 204 and/or computing platform 104. The vehicle location may be used to determine a local jurisdiction. The local jurisdiction may be a state, cite, township, county, or any other municipality that may have specific rules and laws regulating parking. In one example, the jurisdiction may have a law or rule requiring that a vehicle park within a certain distance of a curb. Once the controller 204 receives the vehicle location from the GPS module 146, the controller 204 may, via the remote server 162, receive a local regulation or requirement indicating the permitted parking distance $D_4$. The controller 204 may then compare the permitted parking distance $D_4$ to the recommended parking distance $D_3$. In the event that there is a discrepancy between the permitted parking distance $D_4$ and the recommended distance $D_4$, e.g., the permitted parking distance $D_4$ is less than the recommended parking distance $D_3$, the controller 204 may issue a warning to the driver.

While the controller 204 may receive local regulations from the remote server 162, the controller 204 may store the regulations, or certain regulations locally so as to make recall of local regulations more efficient for subsequent visits to that jurisdiction. Furthermore, routinely visited jurisdictions may be saved in the database 206.

The parallel parking system 200 may include the vehicle display 138. The vehicle display 138 may present information to the driver regarding certain park assist features, including various information about objects determined to be adjacent to the available parking place. The alerts may be presented to the driver via the vehicle display 138. The alert may include textual or pictorial indications relating to the parking instructions, specifically in the event that the permitting parking distance D4 would be exceeded by the recommended parking distance. The alert may be in the form of an audible alert via the vehicle speakers 130. Additionally or alternatively, the alert could be presented at another device such as the mobile device 152.

FIGS. 3A-5C illustrate example parking scenarios for the parallel parking system 200. FIG. 3A illustrates an example scenario of an object 304 (or obstruction) adjacent to an available parking place 306. The vehicle 102 may include a vehicle door 302 that when open, may extend a predefined distance away from the vehicle 102, as shown by the door distance $D_2$. Once parked, the object 304 may be an object distance $D_1$ away from the parked vehicle 102. As discussed above, based on the vehicle location, a local jurisdiction may have parking restrictions with respect to how far away from a curb a vehicle may permissibly park. The permitted parking distance $D_4$ is also shown in FIG. 3A.

FIG. 3B illustrates an example scenario of the vehicle 102 parked in the available parking place 306 (as shown in FIG. 3A). The vehicle 102 may be within a certain distance of the object 304 (e.g., object distance $D_1$). Upon opening the vehicle door 302, which may have a door distance $D_2$, the vehicle door 302 may come into contact with the object 304, thus causing damage to the vehicle door 302 and/or the object 304. In this example, the object distance $D_1$ is less than the door distance $D_2$ and therefore the door 302 makes contact with the object 304 when opened.

FIG. 3C illustrates an example scenario of the vehicle 102 parked in the available parking place 306 (as shown in FIG. 3A). The vehicle 102, however, may be parked away from the curb at the recommended parking distance $D_3$. By parking the vehicle 102 away from the curb, the vehicle 102 is also parked away from the object 304 at least far enough so that the door 302 may be opened without coming into contact with the object 304.

Figure 4:
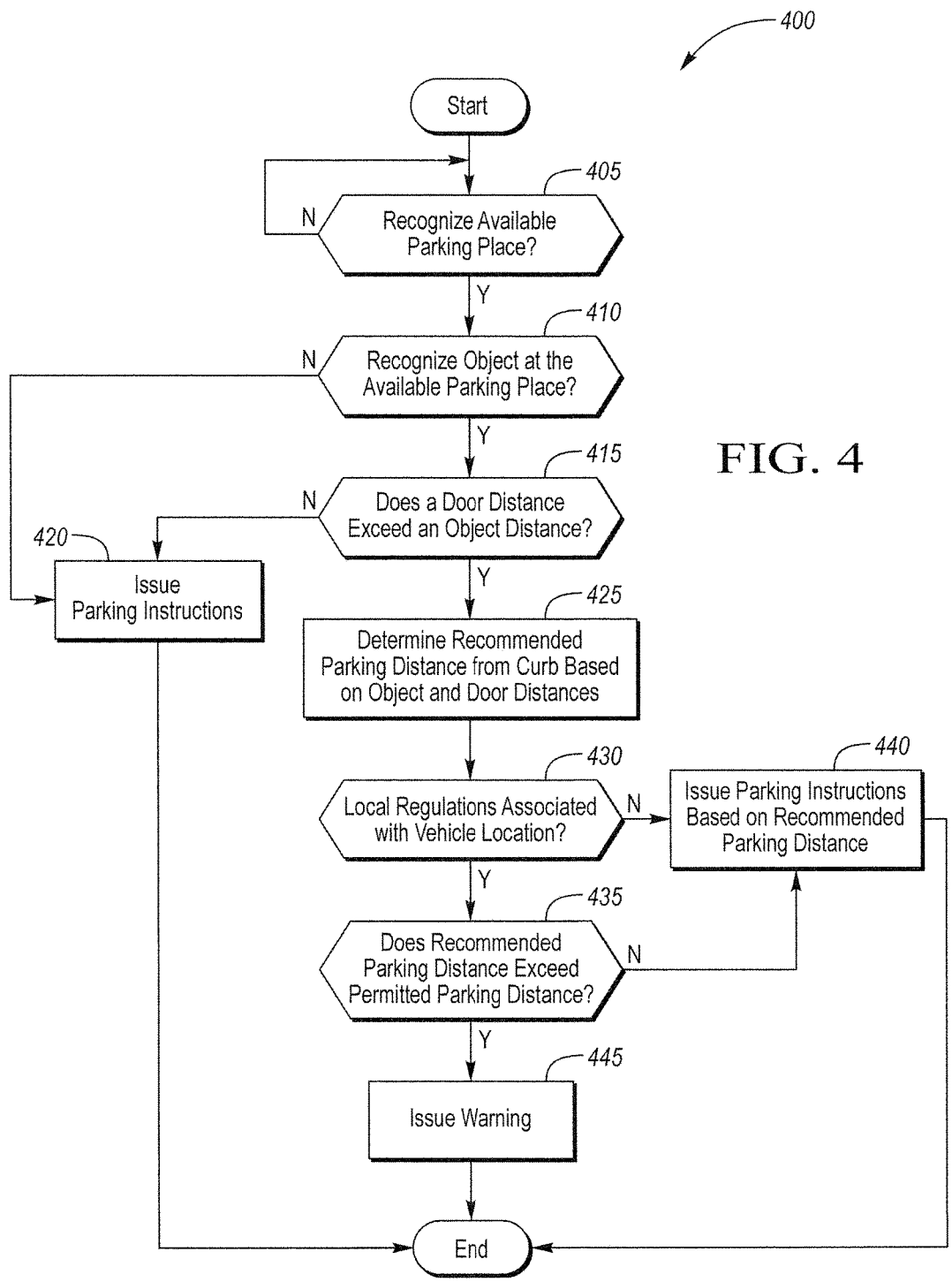
FIG. 4 illustrates an example process for the parallel parking system.

FIG. 4 illustrates an example process 400 for the parallel parking system 200. The process 400 may begin at block 405. At block 402, the controller 204 may, via the sensors 202, recognize an available parking place. Once an available parking place is recognized, the process 400 proceeds to block 410.

At block 410, the controller 204 may determine whether an object 304 or obstruction is adjacent the available parking place. This may be recognized via the data provided by the sensors 202. Additionally, if an object 304 is recognized, the controller 204 may determine the object distance $D_1$. If an object 304 is recognized, the process 400 proceeds to block 415. If not, the process proceeds to block 420.

At block 415, the controller 204 may determine whether the door distance $D_2$ is greater than the object distance $D_1$. As explained above, if the door distance $D_2$ is greater than the object distance $D_1$, than upon opening the door 302, the door 302 may come into contact with the object 304. In this case, the process 400 proceeds to block 425. If the door distance $D_2$ is not greater than the object distance $D_1$, the process 400 proceeds to block 420.

At block 425, the controller 204 may determine the recommended parking distance $D_3$ such that the door 302 may open without coming into contact with the object 304. The recommended parking distance $D_3$ may be a distance away from the curb such that the door 302 freely. The recommended parking distance $D_3$ may be the difference between the object distance $D_1$ and the door distance $D_2$, plus a variance. The process 400 may proceed to block 430.

At block 430, the controller 204, based on the vehicle location received from the GPS module 146, may determine whether local regulations exist with respect to curb-side parking. Such regulations may be acquired from the remote server 162 depending on the jurisdiction that the vehicle 102 is currently in. If local regulations are found, the process proceeds to block 435. If not, the process proceeds to block 440.

At block 435, the controller 204 may determine whether the recommended parking distance $D_3$ exceeds the permitted parking distance $D_4$, as defined by local regulations. If so, the process 400 proceeds to block 445. If not, the process 400 proceeds to block 440.

At block 445, the controller 204 may issue a warning that the recommended parking distance $D_3$ required to open the door 302 without contact being made with the object 304 exceeds the permitted parking distance $D_4$ allowed by local requirements. As explained above, the alert may be made in the form of a visual display on the vehicle display 138. The alert may be an audible alert via the vehicle speaker 130. Additionally or alternatively, the alert may be displayed or audibly broadcast via another device such as the mobile device 152.

At block 420, the controller 204 may be configured to issue parking instructions. These instructions may include instructions to the various vehicle systems to park the vehicle 102 using any of the park assist features, include the PPA feature. The PPA feature may park the vehicle 102 along the curb in a normal or usual form since the object 304 has been determined to be located far enough away from the curb that the door 302 may open without coming into contact with the object 304.

At block 440, the controller 204 may be configured to issue parking instructions based on the recommended parking distance $D_3$. That is, similar to block 420, the controller 204 may instruct various vehicle systems to park the car using the park assist features, including the PPA feature. However, the parking location of the vehicle 102 may be adjusted in view of the recommended parking distance $D_3$ in order to accommodate unhindered opening of the door 302. The parallel parking system 200 may take into consideration the recommended parking distance $D_3$ and park the vehicle 102 away from the curb for that respective distance.

Accordingly, a parallel parking system is disclosed herein for taking into consideration the distance needed to open a vehicle door in a parked position so as to avoid contact with objects outside of the vehicles. The system also takes into consideration local laws that may provide limit to the distance away from a curb that a vehicle may permissibly park. The system may be configured to adjust the park assist features to accommodate door opening, as well as issue alerts in response to a parking distance exceeding that allowed by the local jurisdiction.

Computing devices, such as the computing platform, processors, controllers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A parallel parking system comprising: a controller configured to generate an alert identifying a discrepancy between a permitted parking distance that is defined by local legal requirements and a recommended parking distance that is defined by a minimum distance between an object at a curb adjacent to an available parking place to avoid contact with the object and an open vehicle door in a parked position in response to the recommended distance exceeding the permitted distance.

2. The system of claim 1, further comprising a vehicle location module configured to transmit a vehicle location to the controller, wherein the local legal requirements are identified from the vehicle location.

3. The system of claim 1, wherein the minimum distance is based on an open door distance of the vehicle.

4. The system of claim 3, wherein the minimum distance is based on a difference between the open door distance and a distance between the object and an expected position of the vehicle in the available parking place.

5. The system of claim 1, wherein the alert includes a visual alert.

6. The system of claim 1, wherein the alert includes an audible alert.

7. A parking system for a vehicle comprising: a controller configured to generate an alert identifying a discrepancy between a permitted parking distance that is defined by local legal requirements and a recommended parking distance away from a curb that is based on an open door distance associated with the vehicle and an object distance associated with an object adjacent to an available parking place for the vehicle.

8. The system of claim 7, further comprising a vehicle location module configured to transmit a vehicle location to the controller, wherein the local legal requirements are identified from the vehicle location.

9. The system of claim 7, wherein the object distance is a distance between an expected position of the vehicle in the available parking place and the object.

10. The system of claim 7, wherein the alert includes a visual alert.

11. The system of claim 7, wherein the alert includes an audible alert.

12. A method comprising: recognizing an object at a curb adjacent to a parking place for a vehicle; identifying a recommended parking distance based on an open door distance associated with the vehicle and a distance between the object and an expected position of the vehicle in the parking place; and generating an alert in response to the recommended legal distance exceeding a permitted distance that is defined by a location of the vehicle.

13. The method of claim 12, further comprising issuing parking instructions.

14. The method of claim 12, wherein the alert includes an audible alert.

15. The method of claim 12, wherein the alert includes a visual alert.

* * * * *